O. WUNDRACK.
BAKER'S OVEN.
APPLICATION FILED MAR. 11, 1920.
1,391,157. Patented Sept. 20, 1921.
4 SHEETS—SHEET 3.
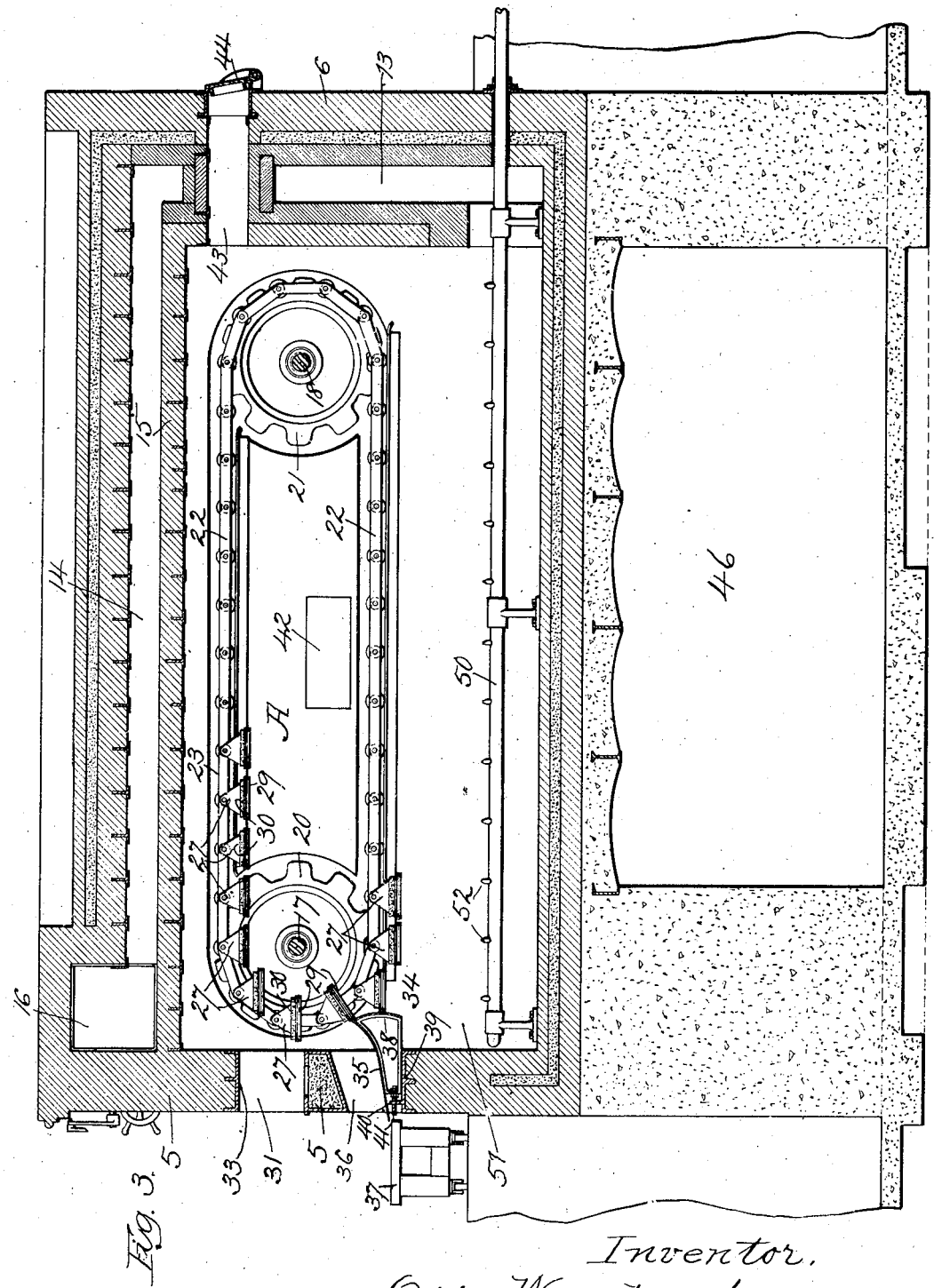
Inventor,
Otto Wundrack,
By Frank L. Thomason Atty

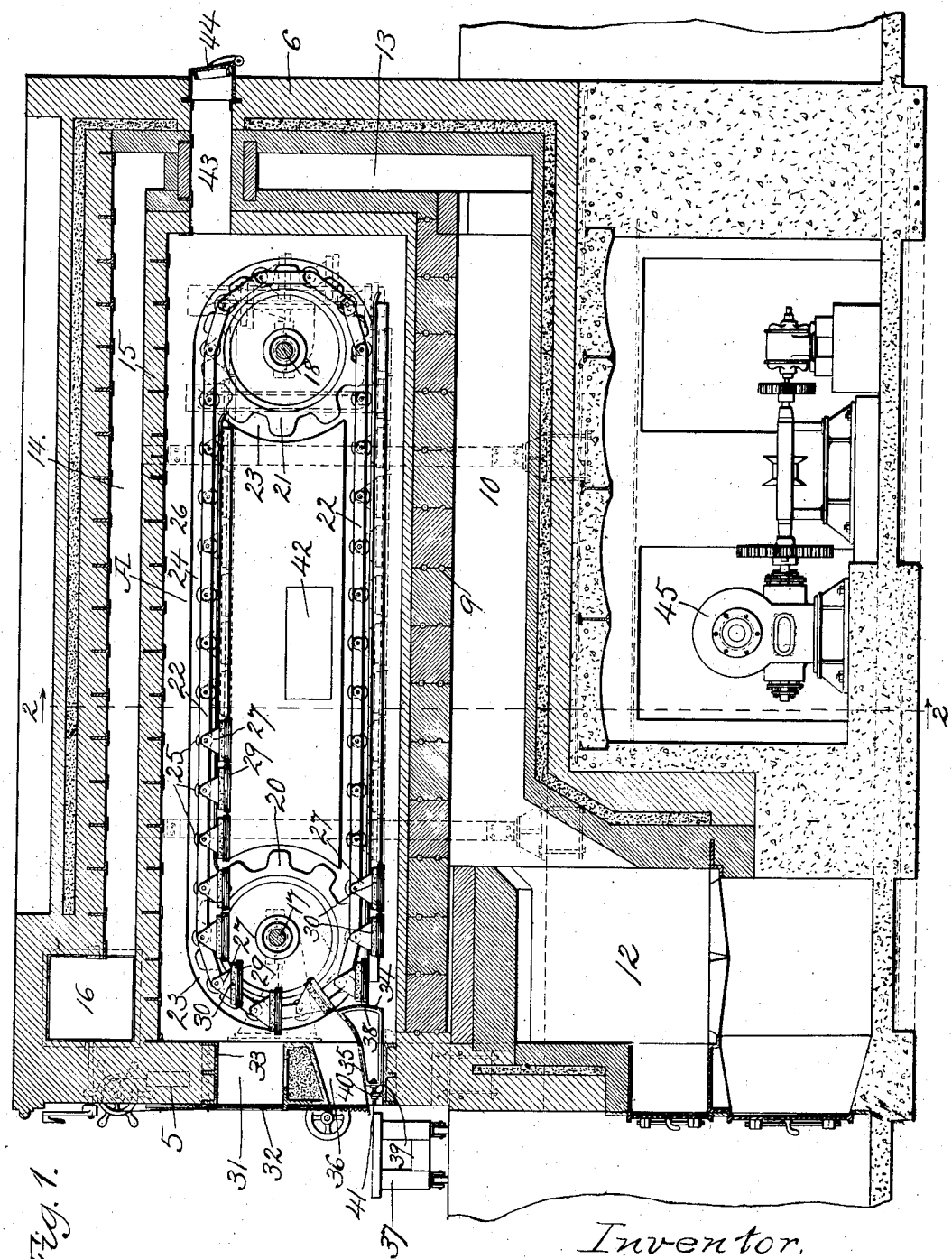

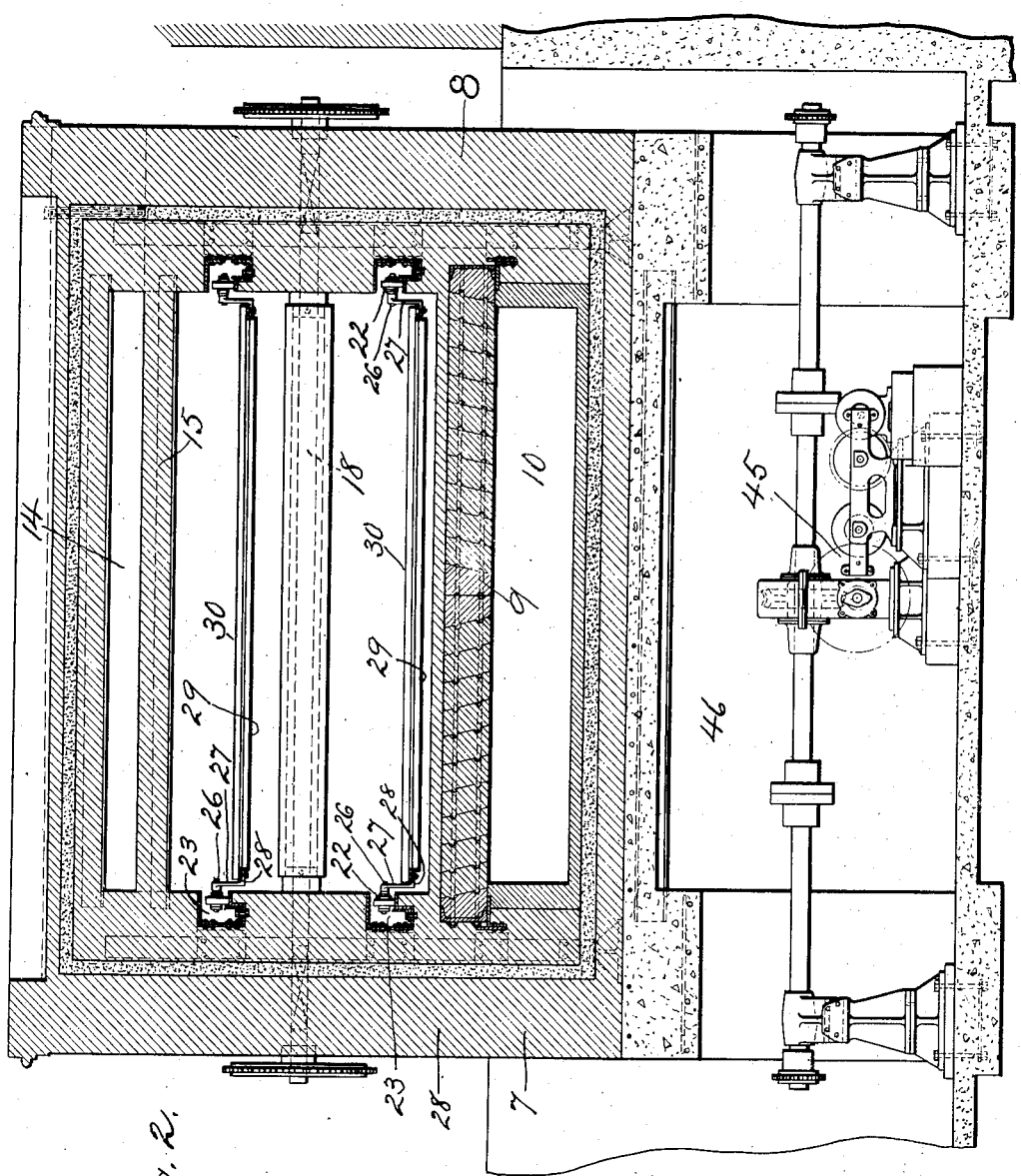

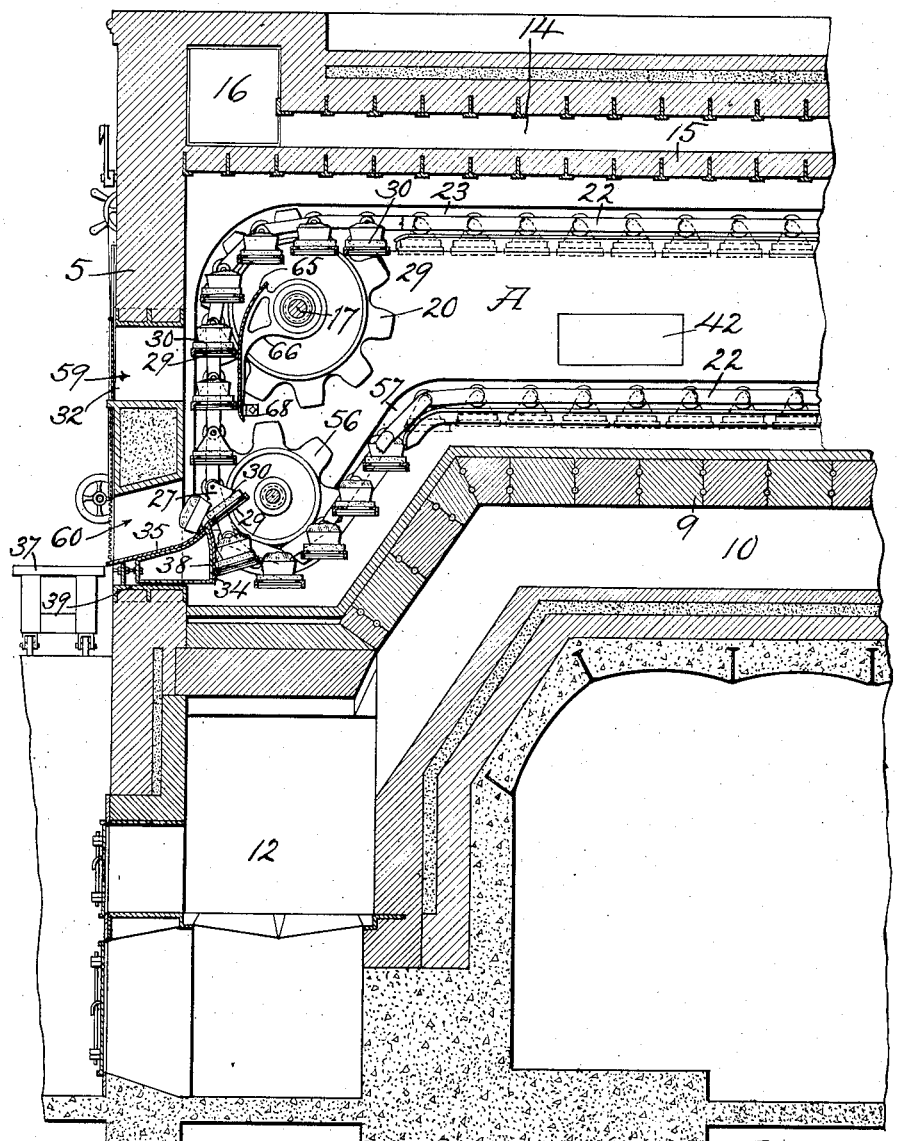

UNITED STATES PATENT OFFICE.

OTTO WUNDRACK, OF MAYWOOD, ILLINOIS, ASSIGNOR TO THERESIA WUNDRACK, OF CHICAGO, ILLINOIS.

BAKER'S OVEN.

1,391,157.  Specification of Letters Patent.  Patented Sept. 20, 1921.

Application filed March 11, 1920. Serial No. 364,937.

*To all whom it may concern:*

Be it known that I, OTTO WUNDRACK, a citizen of the United States, residing at Maywood, in the county of Cook and State of Illinois, have invented new and useful Improvements in Bakers' Ovens, of which the following is a full, clear, and exact description.

My invention relates to bakers' ovens and particularly to ovens for baking bread. Heretofore bread has been baked in ovens having a traveling hearth built on the endless chain principle. Pans of unbaked dough were inserted through the front door of these ovens and placed on the trays forming a part of such hearth and were moved in one direction through the baking chamber and the baked bread was removed from the rear of the oven. Other ovens were used in which the pans of dough were introduced through the front of the oven onto the trays of an endless hearth and moved rearwardly until the rear of the baking chamber was reached, and were allowed to remain in this position until baked, and then the hearth was moved in the opposite direction and the baked bread removed from the same door through which they were introduced. Both of these systems are objectionable because, in the first instance, the oven had to be very long and very costly, and, in the second instance, only one half of the traveling hearth could be inside the baking chamber at one time, and the baking process was a slow procedure, and not only was it objectionable on this account but because of the necessity of reversing the movement of the hearth, and the inability to bake the goods evenly—the goods on the ends being subjected to a different degree of heat than those in the center of the baking chamber.

The object of my invention is to construct a bakers' oven having an endless traveling hearth, that is inclosed wholly within the baking chamber, and moves in but one direction, in which the opening through which the unbaked goods is introduced into the baking chamber, and the opening through which the baked goods are withdrawn are located at the same end of the oven, and in, which the bakery output is twice that of any other furnace of the same size. These and other objects I accomplish by a comparatively simple and economically constructed bakers' oven, substantially as hereinafter fully described and as illustrated in the drawings, in which—

Figure 1 is a longitudinal vertical section of my improved bakers' oven.

Fig. 2 is a transverse vertical section taken on dotted line 2, 2, Fig. 1.

Fig. 3 is a longitudinal vertical section of a modified construction of said improved oven.

Fig. 4 is a longitudinal vertical section of the front half of one of my improved ovens illustrating the preferred construction of the front end of the same.

The construction of the walls and roof of the oven to which my improvements are applied is in accordance with the best experience in this line of work, and embodies nothing new. The baking chamber A within this structure extends from the front wall 5 to the rear wall 6 and from sidewall 7 to sidewall 8, and the floor of this chamber consists of flat arch 9. This arch bridges over a smoke-chamber 10 through which the products of combustion from a furnace 12 flow in transit to the vertical passage 13 in the rear wall. This passage discharges into a superposed heat chamber 14 above the ceiling 15 that spreads over the entire area of the baking chamber and discharges into a lateral passage 16 located in the side wall immediately back of the top portion of the front wall 5.

The baking chamber A has two transverse shafts therein, located, respectively, near the front end and the rear end of the same. The front shaft 17 has its ends journaled in suitable stationary bearings, and the rear shaft 18 is journaled in bearings that are adjustable longitudinally in the direction of the length of the baking chamber. These bearings do not embody any new features in so far as my invention is concerned, and are therefore merely suggested by dotted lines in the drawings.

Each of the shafts 17 and 18 have two large sprockets wheels, 20, and 21, securely mounted thereon in depressions, 23, 23, in each side wall of the baking chamber, and the sprocket wheels on the corresponding ends of these shafts are connected by endless chains 22, and have one end extending into the baking chamber a short distance on which the upper ends of triangular shaped hangers 27 are loosely journaled. The lower horizontal edges 28 of said hangers are flanged inward, and the flanged end edges of flat transverse metal carriers 29 are mounted upon the same and riveted thereto. These carriers 29 connect the hangers on one side of the baking chamber with the corresponding hangers on the opposite side of said chamber and constitute supports for a soapstone hearth 30, upon which latter the pans containing the bakery goods are placed. In view of the fact that the carriers and hearthstones are below the pivotal spindles 26 and are loosely suspended therefrom, said hearthstones will always be in a horizontal position as the chains carrying them slowly travel in a horizontally elongated circuit from end to end of the heating chamber, except as hereinafter explained.

The front wall 5 of the oven is provided with a doorway 31 that is of such proportions that access can be had therethrough to introduce the pans of unbaked goods on the hearthstones. Doorway 31 is closed by a vertically slidable door 32 and the top plate 33, of this doorway is below the horizontal plane of the hearthstones suspended from the upper horizontal stretch of the endless chain 22.

When the unbaked goods are placed upon the hearthstones suspended from the upper stretch of the link chains as they move upward back of doorway 31, said chain, and hearthstones move into what constitutes the upper stretch of the endless chain 22, and move slowly to the rear until the rear sprocket wheels 21 are reached, whereupon said chain and hearthstones will be carried by the rear sprockets downward until the lowest segment of the peripheries of said wheels are reached, at which latter point the anti-friction wheels of the chain will be delivered onto the tracks of the lower runways and will move, and it will be noticed that the hearthstones will, by reason of their gravity, always be in a horizontal position except when dumped as hereinafter fully explained.

When the carriers reach the forward sprockets 20, and have passed in front of and beyond the transverse vertical plane intersecting the axis of shaft 17, the forward edges of the carrier will be brought in contact with the rear vertically disposed convexly curved segment or cam surface 34, that constitutes the downward extension of the sheet metal incline 35. This incline extends forward and downward from the upper edge of said cam surface 34, out through a discharge doorway 36 located in the front wall 5 of the oven below the doorway 31, and it is, preferably, closed by the same vertically slidable metallic door 32 that closes doorway 31. When the carriers come in engagement with said cam surfaces 34 they are thereby caused to tip or incline into the position shown in Fig. 1 of the drawings, and when the hearthstones reach the top edge of said surface they dump their contents onto the incline 35 and said contents gravitate out through the doorway 36 onto the top of a transversely movable truck 37, by means of which latter the baked goods are transported to any desirable point.

I prefer to make the incline 35 and its rear cam surface 34, adjustable toward and from the baking-chamber. In order to accomplish this result, I securely mount the ends of the incline upon metal open frames 38 the contours of which latter correspond to the transverse shape of the incline and its rear cam surface, and I provide the sill-plate of doorway 36 with vertical lugs 40 and employ gage-bolts 39 that are tapped through lugs 40, and nuts 41 that can be manipulated to move the frames 38 and the incline and its cam-surface rearwardly or forwardly, to insure the hearthstones dumping to the desired extent.

The baking chamber is provided with a suitable heat outlet 42, preferably, at its center of length and below the axes of shafts 17 and 18, and also provide the same at its rear end with a passage 43 that extends through the rear wall 6, which passage has its rear end closed by a suitable hinged cover 44, substantially as shown in the drawings. This passage 43 is utilized to permit access to the baking chamber whenever necessary.

The top of the doorway 31 is made lower than the horizontal plane of the upper surfaces of the hearthstones carried by the upper stretch of the endless chains, so as to permit the introduction of steam into the upper reaches of the baking chamber, whenever it is desired to provide the moisture to glaze over the tops of the goods being baked. Steam is introduced by a pipe (not shown) and connected with a suitable source of supply. The top of the doorway being below the top of the goods being baked gives assurance that the steam will remain in the upper part of the baking chamber. This is particularly desirable when baking rye bread or vienna. After the steam has accomplished its purpose, the passage 44 can then be opened to permit the moisture laden air to be driven out of the upper part of the baking chamber.

The furnace 12 of my oven is constructed in the usual manner, and it is manipulated in the usual manner from a pit or chamber in front of the foundation or lower part of the front wall 5.

The power generating mechanism 45, which is necessary to drive the endless hearth, is preferably, located in a suitable sub-chamber 46 made in the foundations of the oven, but it is immaterial how said generator is constructed or where it is placed.

In Fig. 3, I show a modified construction of my improved oven as disclosed in Fig. 1 of the drawings. This modification dispenses with the furnace 12 and eliminates the sub-chamber 10 and flat arch 9, and leaves the space occupied by said features open. In the event of this being done, longitudinally disposed gas pipes 50, or electrical heat generating devices (not shown) are introduced into the lower portion of the baking chamber 51, below the endless hearth, and the heat thus generated from the jets 52 of said pipe 50 furnish the high temperature to do the baking.

In Fig. 4 of the drawings the preferred form of my invention is shown. The construction of this oven is just the same as that hereinbefore described with the exception that the front end of the baking chamber A is made deeper than the remainder thereof, and in this deeper forward portion idle sprocket-wheels 56, are placed down around which the endless chains are passed. The forward parts of the runways 57, in which the lower stretch of the endless chains travel, are foreshortened, and curved downward, and the transverse axis of said idle sprocket-wheels is so situated below the axis of the front sprocket-wheels 58, that, between said idle-wheels and front sprockets, the endless chains move vertically. This arrangement permits the upper inlet doorway 59 and the discharge doorway 60 to be separated farther apart, and permits the removal of the baked goods without permitting the escape of the heat from the upper part of the baking chamber while the baking process in is operation.

When introducing the pans of dough into the baking chamber they are sometimes pushed too far to the rear and fall off of the trays onto the bottom of said chamber and burn and the smoke and smell impregnate the remainder of the poducts in process of baking and spoil the same. In order to overcome this danger I have provided a transverse sheet metal shield 65, that is parallel to and interposed between the front shaft 17 and the periphery described by the rear edges of the trays as they move between sprocket wheels 20 and idle-sprocket wheels 56. This shield is disposed in such a position that it is immediately back of the trays as they pass the inlet doorway 31, and when the unbaked goods are introduced through said doorway the edge of the shovel employed for this purpose may be thrust to the rear so far as to strike the shield, but the pans containing said goods will when the shovel is withdrawn always remain on the trays.

The upper portion of said shield is secured at its ends to arms 66, the rear ends of which terminate in bosses 67, that are loosely mounted on shaft 17, and the lower portions of said shield has lateral lugs 68 projecting from its end edges that are bolted or riveted to the side-walls of the baking chamber.

What I claim as new is:

1. In a bakers' oven, a baking chamber the entrance to and discharge from which is through its front wall, an endless hearth comprising endless chains, and a series of hearthstones suspended from said chains that have their supporting surfaces below their points of suspension throughout the length of said chains, and a longitudinally adjustable incline the highest end of which is at the rear of the discharge opening in the front wall of the oven and which has a convex surface extending down from its highest end which is engaged *seriatim* by said hearthstones and tipped to dump their contents onto said incline.

2. In a bakers' oven, a baking chamber, an endless hearth comprising endless chains, and a series of hearthstones suspended from said chains that have their supporting surfaces below their points of suspension, said baking chamber having its entrance and discharge openings in its front wall and the top of its entrance opening below the horizontal plane of the tops of the hearthstones moving in the upper stretch of said hearth, and means adjacent to said discharge opening that tip said hearthstones *seriatim* and cause them to discharge into said discharge opening, said tipping means comprising a chute for the delivery of the goods.

3. In a bakers' oven, a baking chamber, an endless hearth comprising endless chains, and a series of hearthstones suspended from said chains that have their supporting surfaces below their points of suspension, said baking chamber having its entrance and discharge openings in its front wall and the top of its entrance opening below the horizontal plane of the tops of the hearthstones moving in the upper stretch of said hearth, and an incline in said discharge opening having a downward extension depending from its rear edge that tips said hearthstones *seriatim* and causes them to discharge onto said incline.

4. In a bakers' oven, a baking chamber, an endless hearth comprising endless chains, a series of hearth stones suspended from said chains that have their supporting surfaces below their points of suspension, said baking chamber having its entrance and discharge openings in its front-wall, and the top of its entrance opening below the horizontal plane of the tops of the hearth stones moving in the upper run of said hearth, a stationary shield interposed between the axis of the orbit traveled by said hearth stones adjacent to said entrance opening and the trays carried around said axis, and means adjacent to said discharge opening for tipping said hearth stones *seriatim* and delivering the discharged contents from said hearthstones through said discharge opening.

In witness whereof I have hereunto set my hand and affixed my seal this 7th day of February, 1920.

OTTO WUNDRACK.

Witnesses:
FRANK D. THOMASON,
VIOLET WARDELL.